(12) United States Patent
Yang

(10) Patent No.: US 7,885,061 B2
(45) Date of Patent: Feb. 8, 2011

(54) PORTABLE ELECTRONIC DEVICE WITH PROJECTION FUNCTION

(75) Inventor: Ching-Fu Yang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 122 days.

(21) Appl. No.: 12/269,062

(22) Filed: Nov. 12, 2008

(65) Prior Publication Data
US 2009/0257176 A1    Oct. 15, 2009

(30) Foreign Application Priority Data
Apr. 9, 2008    (TW) ............................... 97112827 A

(51) Int. Cl.
  *G06F 1/16*    (2006.01)
(52) U.S. Cl. .................. 361/679.21; 455/573; 348/843; 345/691
(58) Field of Classification Search .............. 455/575.1, 455/575.3, 573; 348/333.01, 51, 843, 552; 361/679.45, 679.33, 679.34, 679.36, 679.37, 361/679.27, 679.21, 679.04, 679.58; 364/708.1; 395/281–283; 345/173, 168, 179, 156, 87, 345/163, 691; 358/1.18, 498
See application file for complete search history.

(56) References Cited

U.S. PATENT DOCUMENTS

| | | | |
|---|---|---|---|
| 6,556,435 B1 * | 4/2003 | Helot et al. | 361/679.45 |
| 2006/0234784 A1* | 10/2006 | Reinhorn | 455/575.1 |
| 2009/0059052 A1* | 3/2009 | Lin et al. | 348/333.01 |

* cited by examiner

*Primary Examiner*—Hung V Duong
(74) *Attorney, Agent, or Firm*—Jianq Chyun IP Office

(57) ABSTRACT

A portable electronic device with a projection function includes a host, a display unit, a bracket, and a projection module. The display unit is pivoted to the host and has a back cover. The bracket is pivoted to the back cover. The projection module is pivoted to the bracket for outputting an image light beam along a projection direction. A pivot angle formed by the projection direction and the back cover can be adjusted by the pivot of the bracket relative to the back cover, and an elevation angle formed by the projection direction and the back cover can be adjusted by the pivot of the projection module relative to the bracket.

11 Claims, 11 Drawing Sheets

PORTABLE ELECTRONIC DEVICE WITH PROJECTION FUNCTION

CROSS-REFERENCE TO RELATED APPLICATION

This application claims the priority benefit of Taiwan application serial no. 97112827, filed on Apr. 9, 2008. The entirety of the above-mentioned patent application is hereby incorporated by reference herein and made a part of this specification.

BACKGROUND OF THE INVENTION

1. Field of the Invention

The present invention relates to an electronic device and more particularly, to a portable electronic device with a projection function.

2. Description of Related Art

With advancement in projection display technology, there have been rapid development and significant breakthroughs in projection systems and equipment in recent years. Currently, there are three major types of projectors including cathode ray tubes (CRTs), high temperature polysilicon transmissive liquid crystal display panels (commonly referred to as liquid crystal projectors), and digital light source processors, wherein the liquid crystal projectors characterized by portability and easy adjustability are more frequently used by the public.

An operating principle of a projector is the same as that of a transparency or that of a slide, which uses a high-luminance lamp as a light source and projects content onto a white screen or a wall. All images of the projector are projected from a single lens in no need of adjusting the focus of the images. At present, the projector is often used to project and magnify an image on a transparency onto a white screen or a wall for purposes of propaganda, lecture, presentation, and so on. In addition, the projector can be further connected to a computer directly and project images on the computer onto a white screen or a wall, which saves the trouble of making transparencies and further promotes the practice of a paperless office.

However, in the current workplace, the projector is still often used together with a notebook computer in order to display an image on a computer screen onto a large screen or a wall for use in a conference or a demonstration. Consequently, transportation and storage of relevant projection equipment and the notebook computer as well as installation of connections between the projection equipment and the notebook computer result in problems including inconvenient usage as well as difficult and time-consuming installation.

SUMMARY OF THE INVENTION

The present invention is directed to a portable electronic device having a projection module that is pivoted to a back cover. A user is able to use the projection module in a simple and easy manner by adjusting a projection direction of the projection module.

In the present invention, a portable electronic device including a host, a display unit, a bracket, and a projection module is provided. The display unit is pivoted to the host and has a back cover. The bracket is pivoted to the back cover. The projection module is pivoted to the bracket for outputting an image light beam along a projection direction. A pivot angle formed by the projection direction and the back cover can be adjusted by the pivot of the bracket relative to the back cover, and an elevation angle formed by the projection direction and the back cover can be adjusted by the pivot of the projection module relative to the bracket.

In one embodiment of the present invention, the bracket has an elastic flange, the back cover has a plurality of positioning recesses, and the elastic flange can be lodged into one of the positioning recesses for fixing a position of the bracket relative to the back cover.

In one embodiment of the present invention, one of the projection module and the bracket has a bearing, and the other one of the projection module and the bracket has an axle fitting the bearing.

In one embodiment of the present invention, the projection module has a first annular wave-shaped surface, and the bracket has a second annular wave-shaped surface corresponding to the first annular wave-shaped surface to pivot stepwise the projection module relative to the bracket.

In one embodiment of the present invention, the portable electronic device further includes a first component and a second component. The first component is disposed in the projection module. The second component is disposed in the bracket. The first component and the second component have a magnetic attraction force therebetween to force the first annular wave-shaped surface to contact the second annular wave-shaped surface.

In one embodiment of the present invention, at least one of the first component and the second component is a permanent magnet.

In one embodiment of the present invention, at least one of the first component and the second component is a magnetically sensitive component.

In one embodiment of the present invention, the host has an operation surface, a keyboard, and a touch panel. The keyboard and the touch panel are disposed on the operation surface.

In the present invention, a portable electronic device including a host, a display unit, and a projection module is further provided. The display unit is pivoted to the host and has a back cover. The projection module is pivoted to the back cover for outputting an image light beam along a projection direction. Here, a pivot angle or an elevation angle formed by the projection direction and the back cover can be adjusted by the pivot of the projection module relative to the back cover.

In one embodiment of the present invention, the projection module has an elastic flange, the back cover has a plurality of positioning recesses, and the elastic flange can be lodged into one of the positioning recesses for fixing a position of the projection module relative to the back cover.

In one embodiment of the present invention, the host has an operation surface, a keyboard, and a touch panel. The keyboard and the touch panel are disposed on the operation surface.

When a user needs to use the projection module of the present invention, the pivot angle formed by the projection direction and the back cover can be adjusted by the pivot of the bracket relative to the back cover, and the elevation angle formed by the projection direction and the back cover can be adjusted by the pivot of the projection module relative to the bracket. As such, it is more convenient for the user to project an image of the display unit by using the projection module without additionally purchasing a conventional projector. Thereby, troublesome installation of circuits connected between the conventional projector and the electronic device can be prevented.

In order to make the above and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
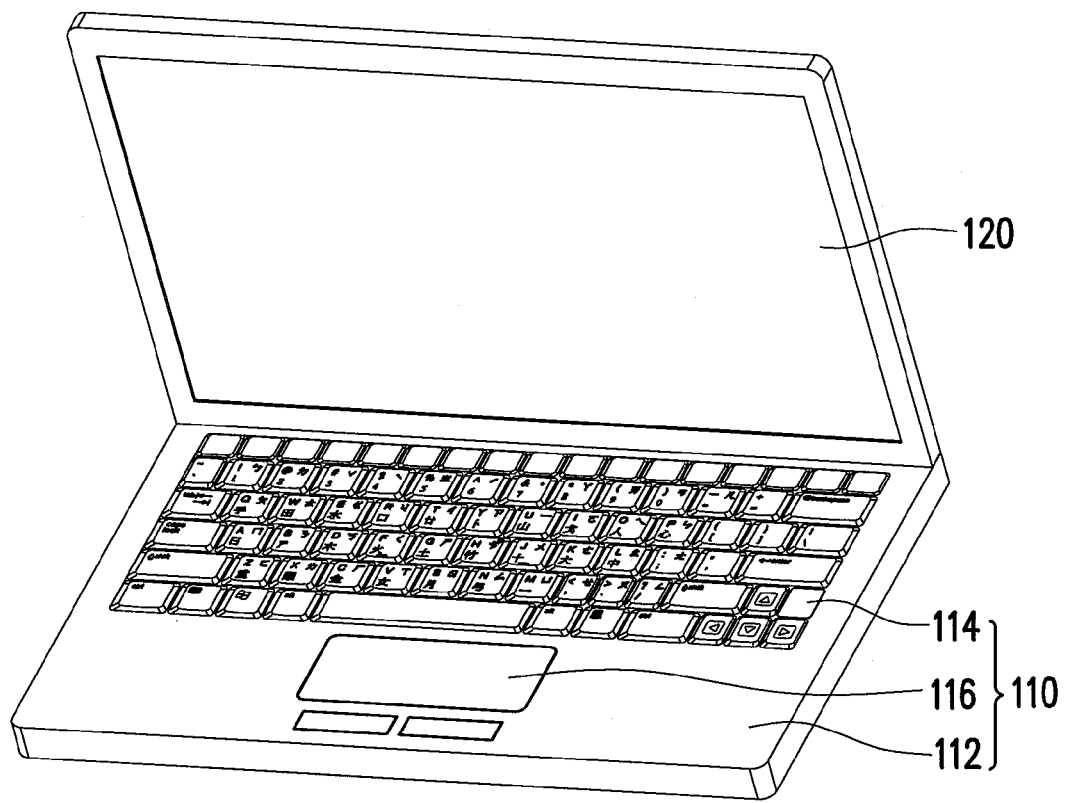
FIG. 1A is a schematic view of a portable electronic device with a projection function according to one embodiment of the present invention.
Figure 1B:
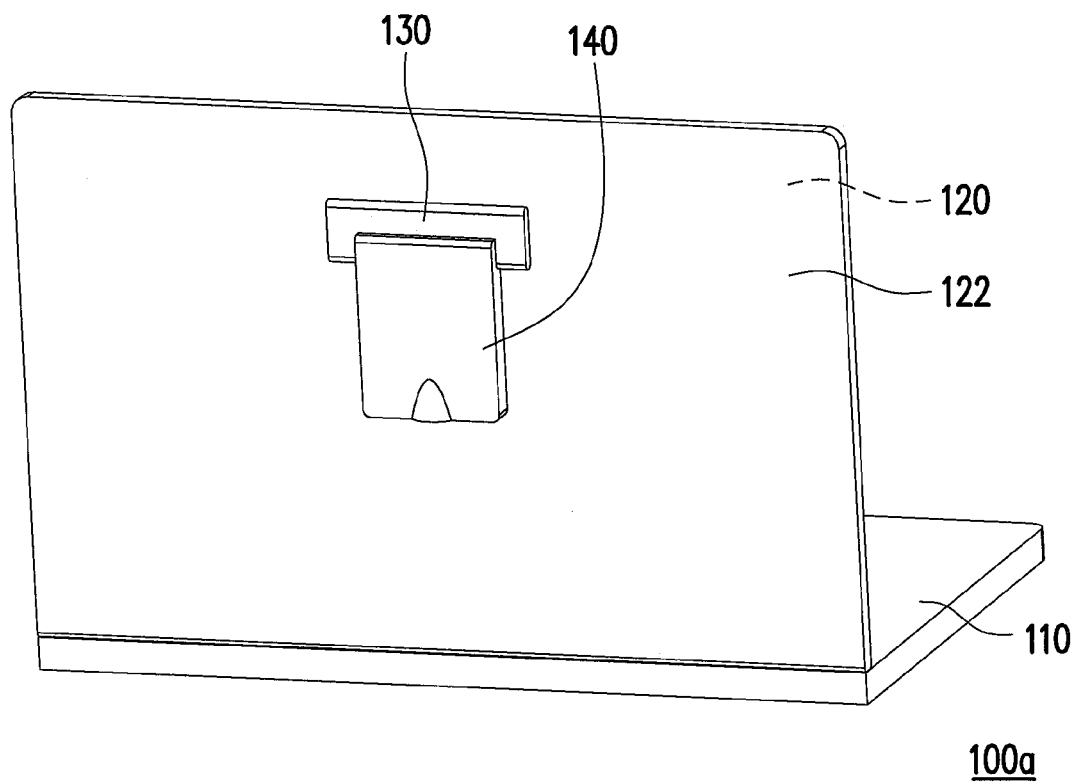
FIG. 1B is a schematic view of a back cover, a bracket, and a projection module depicted in FIG. 1A.

FIG. 1A is a schematic view of a portable electronic device with a projection function according to one embodiment of the present invention. FIG. 1B is a schematic view of a back cover, a bracket, and a projection module depicted in FIG. 1A. Referring to FIGS. 1A and 1B, in the present embodiment, a portable electronic device 100a includes a host 110, a display unit 120, a bracket 130, and a projection module 140. Here, the portable electronic device 100a is, for example, a notebook computer.

Specifically, the host 110 has an operation surface 112, a keyboard 114, and a touch panel 116. The keyboard 114 and the touch panel 116 are disposed on the operation surface 112. The display unit 120 is pivoted to the host 110 and has a back cover 122. The bracket 130 is pivoted to the back cover 122. The projection module 140 is pivoted to the bracket 130 for outputting an image light beam along a projection direction.

Figure 2A:
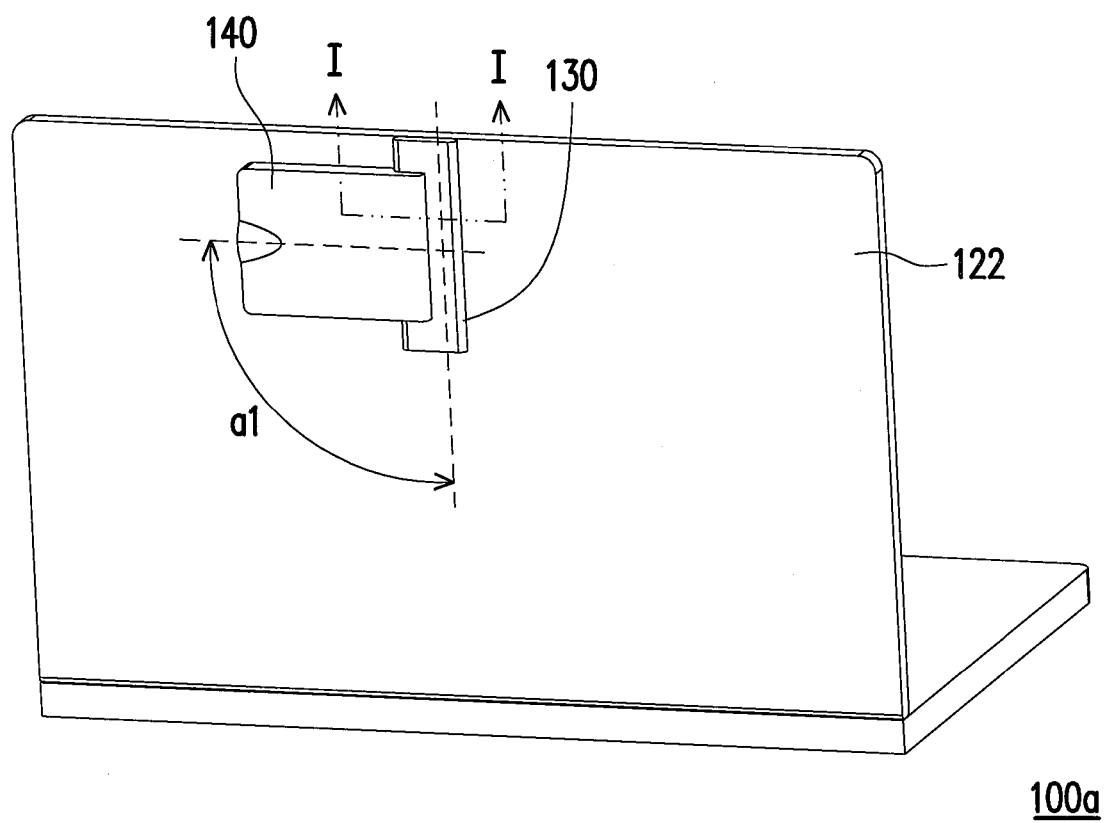
FIG. 2A is a schematic view illustrating a pivot of the bracket and the projection module depicted in FIG. 1B relative to the back cover.
Figure 2B:
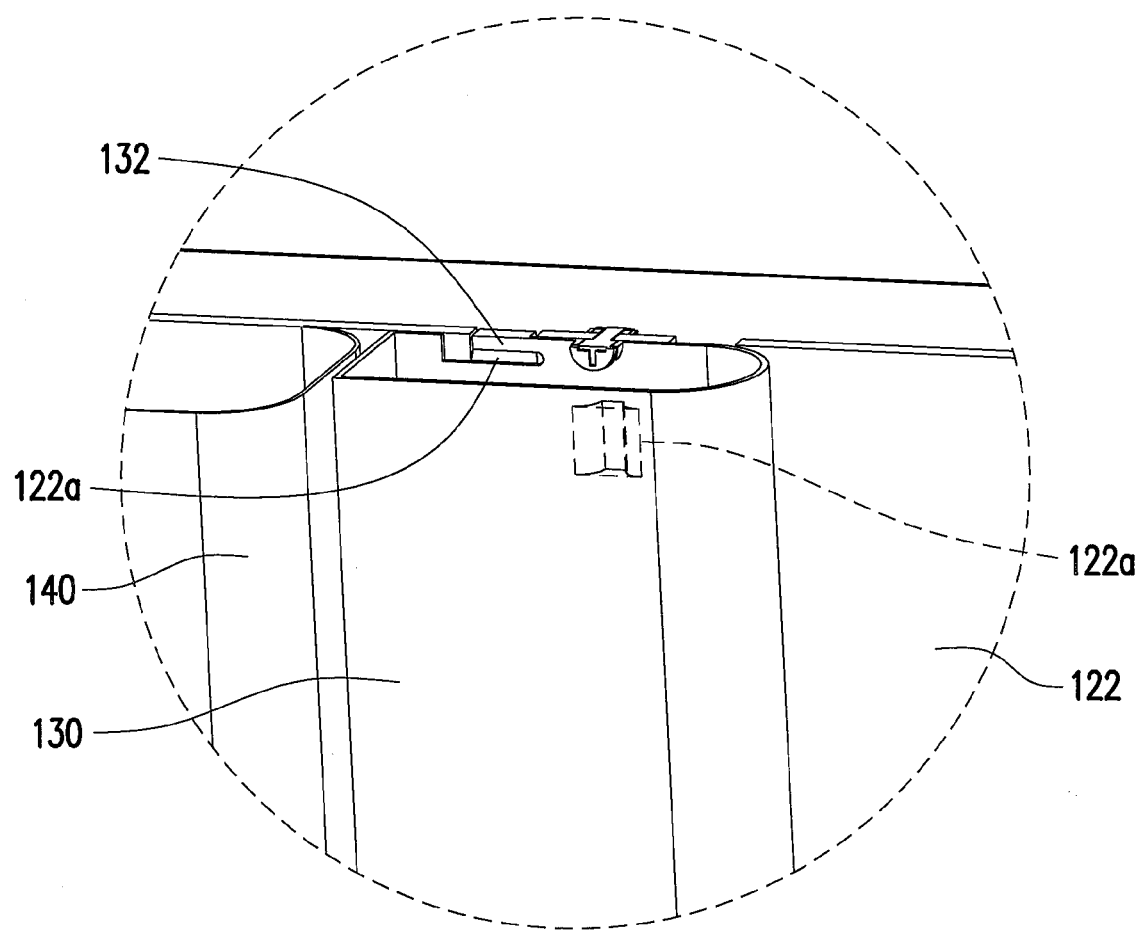
FIG. 2B is a schematic view taken along a line I-I depicted in FIG. 2A in which parts of the portable electronic device are removed.

FIG. 2A is a schematic view illustrating a pivot of the bracket and the projection module depicted in FIG. 1B relative to the back cover. FIG. 2B is a schematic view taken along a line I-I depicted in FIG. 2A in which parts of the portable electronic device are removed. Referring to FIGS. 2A and 2B, in the present embodiment, the bracket 130 has an elastic flange 132, the back cover 122 has a plurality of positioning recesses 122a, and the elastic flange 132 can be lodged into one of the positioning recesses 122a for fixing a position of the bracket 130 relative to the back cover 122.

In brief, according to the present embodiment, a pivot angle a1 formed by the projection direction and the back cover 122 can be adjusted by the pivot of the bracket 130 relative to the back cover 122, and the elastic flange 132 is lodged into one of the positioning recesses 122a for fixing the position of the bracket 130 relative to the back cover 122. Thereby, an image on the display unit 120 can be projected by adjusting the projection direction of the projection module 140 in a relatively simple and easy manner.

Figure 3A:
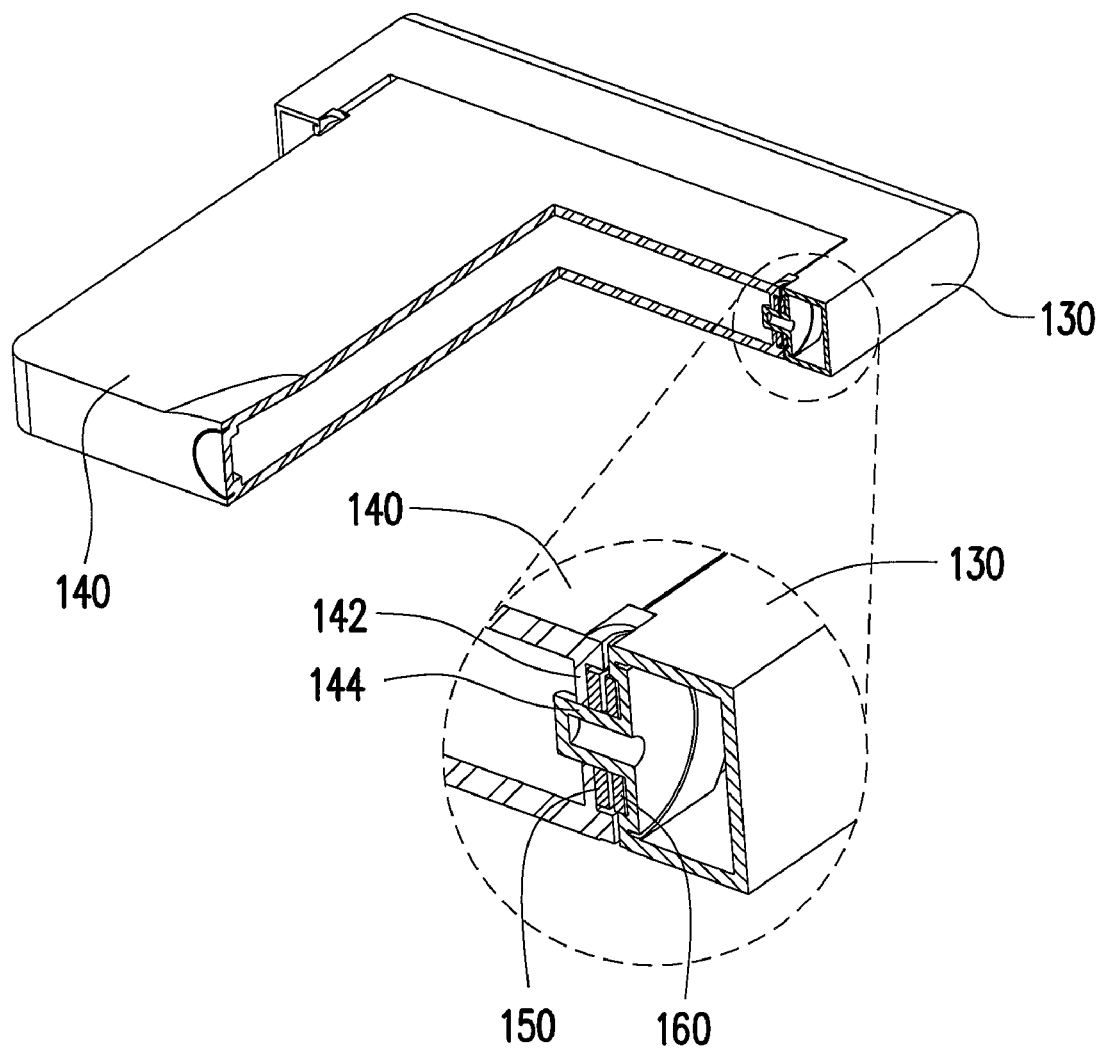
FIG. 3A is a partial cross-sectional view of the projection module and the bracket depicted in FIG. 1B.

FIG. 3A is a partial cross-sectional view of the projection module and the bracket depicted in FIG. 1B. Referring to FIG. 3A, in the present embodiment, the projection module 140 has a bearing 142, and the bracket 130 has an axle 144 fitting the bearing 142. Here, the bearing 142 is utilized for keeping the axle 144 to be centrally positioned.

It should be mentioned that the positions of the bearing 142 and the axle 144 are not limited to those described in the present invention. In another embodiment, the bracket 130 may have the bearing 142, and the projection module 140 may have the axle 144 fitting the bearing 142, which still belongs to a technical means adoptable in the present invention and falls within the protection scope of the present invention.

Figure 3B:
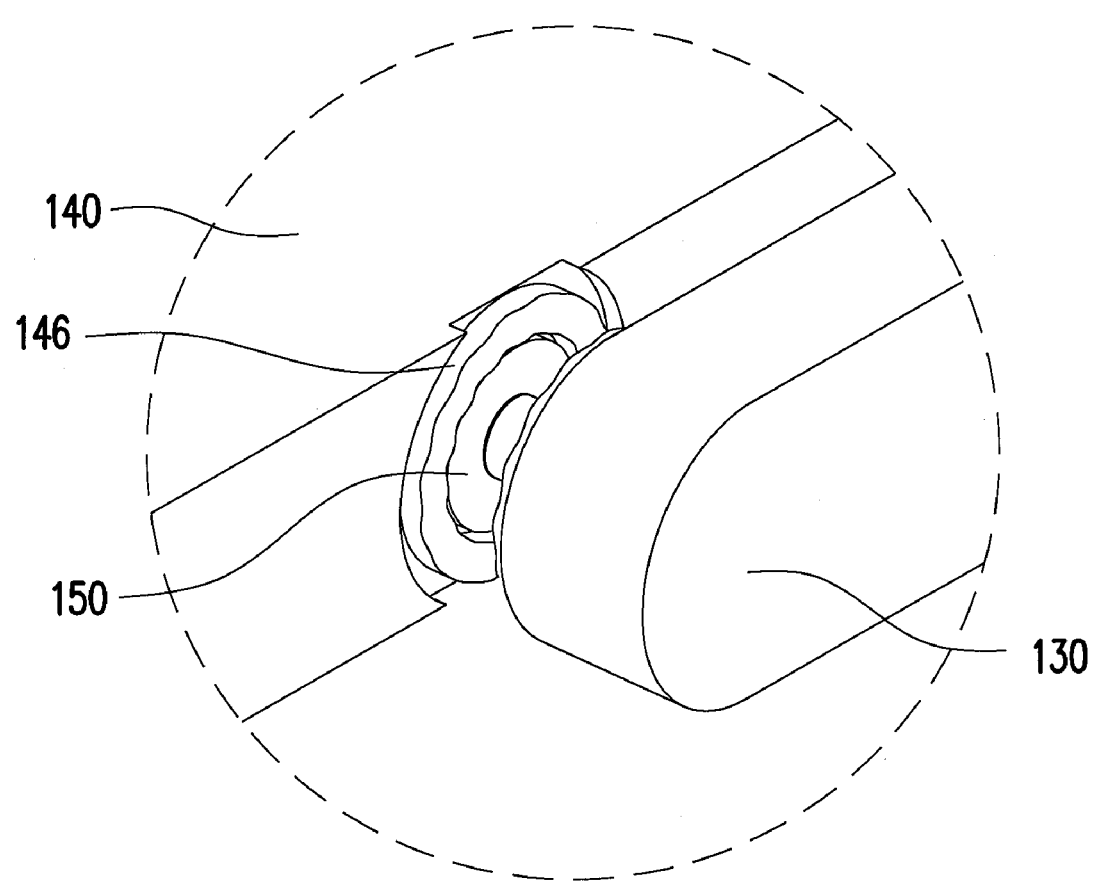
FIG. 3B is a schematic partial enlarged view of the projection module and the bracket depicted in FIG. 3A.
Figure 3C:
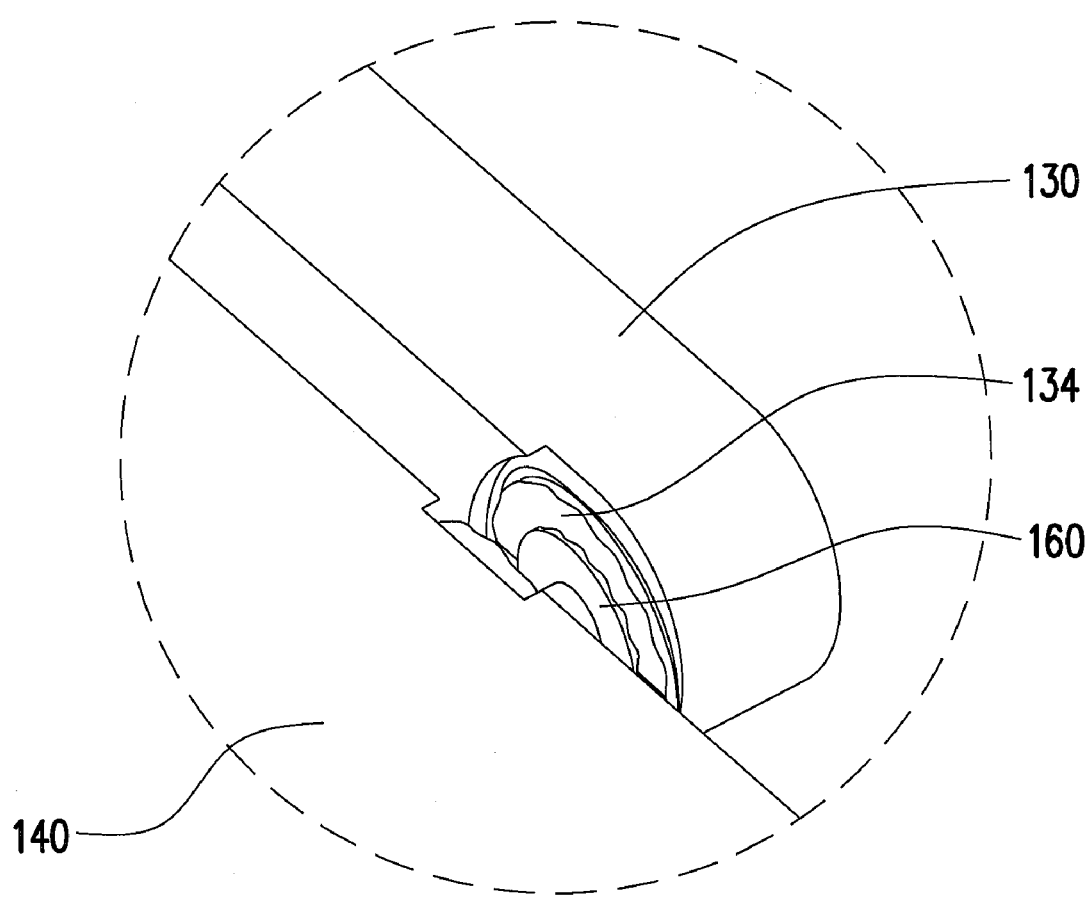
FIG. 3C is a schematic view of the projection module and the bracket depicted in FIG. 3B from another viewing angle.

FIG. 3B is a partial enlarged view of the projection module and the bracket depicted in FIG. 3A. FIG. 3C is a schematic view of the projection module and the bracket depicted in FIG. 3B from another viewing angle. Referring to FIGS. 3B and 3C, in the present embodiment, the projection module 140 has a first annular wave-shaped surface 146, and the bracket 130 has a second annular wave-shaped surface 134 corresponding to the first annular wave-shaped surface 146, so as to pivot stepwise the projection module 140 relative to the bracket 130.

In addition, in the present embodiment, the portable electronic device 100a further includes a first component 150 and a second component 160. The first component 150 is disposed in the projection module 140. The second component 160 is disposed in the bracket 130. The first component 150 and the second component 160 have a magnetic attraction force therebetween to force the first annular wave-shaped surface 146 to contact the second annular wave-shaped surface 134.

Note that the first component 150 is a permanent magnet and the second component 160 is a magnetically sensitive component according to the present embodiment. However, the present invention does not limit the types of the first component 150 and the second component 160. In another embodiment, the second component 160 may be a permanent magnet and the first component 150 may be a magnetically sensitive component, which still belongs to a technical means adoptable in the present invention and falls within the protection scope of the present invention.

In detail, the magnetic attraction force between the first component 150 and the second component 160 forces the first annular wave-shaped surface 146 to contact the second annular wave-shaped surface 134. Besides, a rotation angle of the projection module 140 relative to the bracket 130 is adjusted by pivoting the first annular wave-shaped surface 146 relative to the second annular wave-shaped surface 134.

Figure 3D:
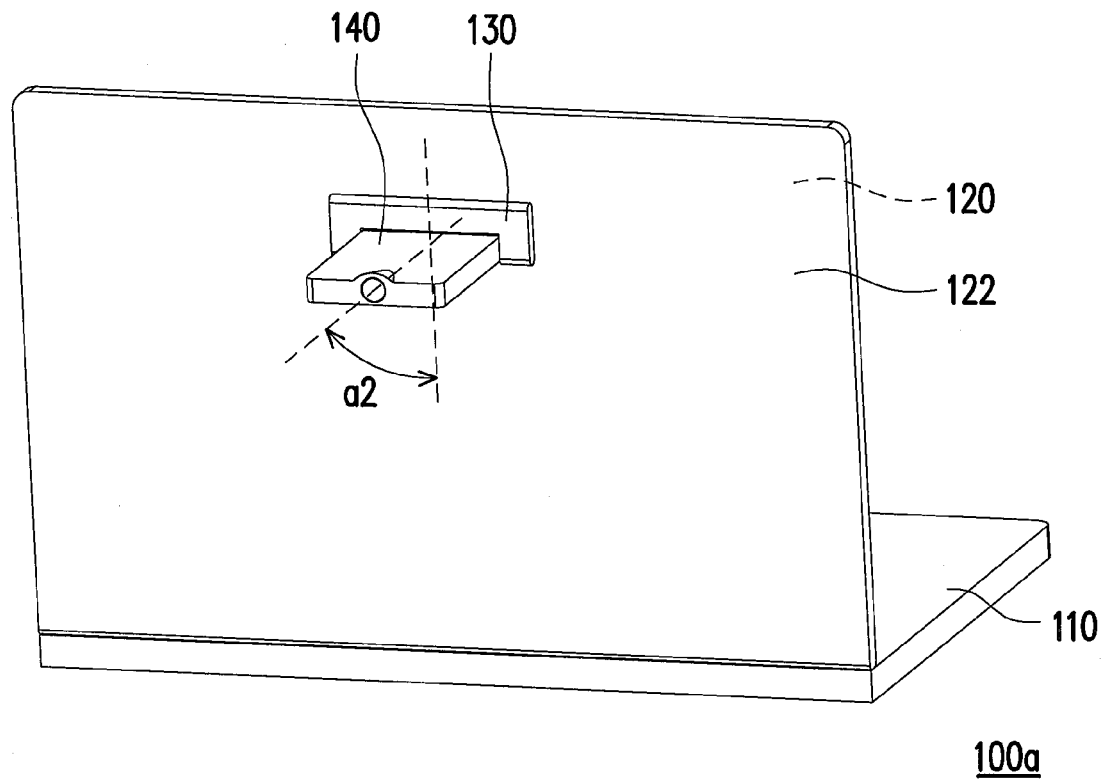
FIG. 3D is a schematic view of an elevation angle formed by a projection direction and the back cover depicted in FIG. 2A.

Namely, as shown in FIG. 3D, an elevation angle a2 formed by the projection direction and the back cover 122 can be adjusted by pivoting stepwise the projection module 140 relative to the bracket 130. In addition, a user is able to adjust a position of a projected image by means of the rotation angle of the projection module 140 relative to the bracket 130. Thereby, the projection module 140 can be used in a relatively simple and easy manner.

In brief, when a user needs to use the projection module 140, the pivot angle a1 formed by the projection direction and the back cover 122 can be adjusted by the pivot of the bracket 130 relative to the back cover 122, so as to easily and conveniently adjust the projection direction. Moreover, the elevation angle a2 formed by the projection direction and the back cover 122 can be adjusted by pivoting stepwise the projection module 140 relative to the bracket 130. As such, the position of the projected image can be adjusted by means of the rotation angle of the projection module 140 relative to the bracket 130, and the image of the display unit 120 can then be projected.

Based on the above, it is more convenient for a user to use the projection module 140 without additionally purchasing a conventional projector, such that troublesome installation of circuits connected between the conventional projector and the electronic device can be prevented, and the portable electronic device 100a can be applied more extensively.

Figure 4A:
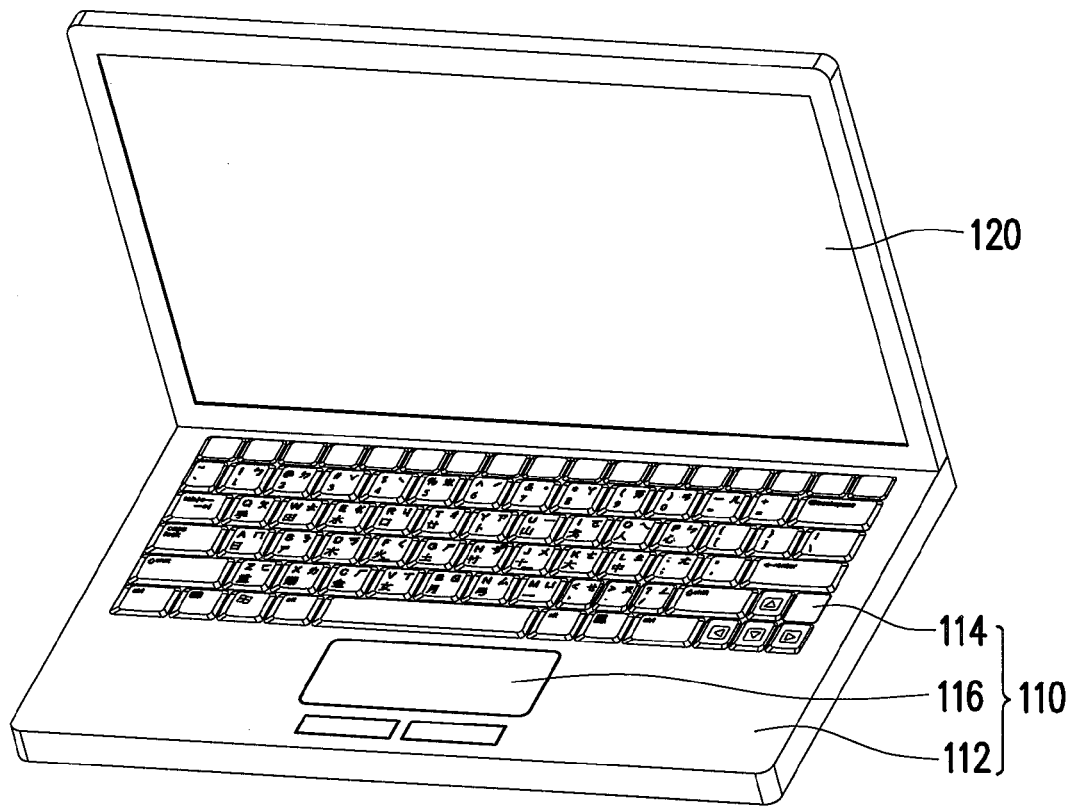
FIG. 4A is a schematic view of a portable electronic device with a projection function according to another embodiment of the present invention.
Figure 4B:
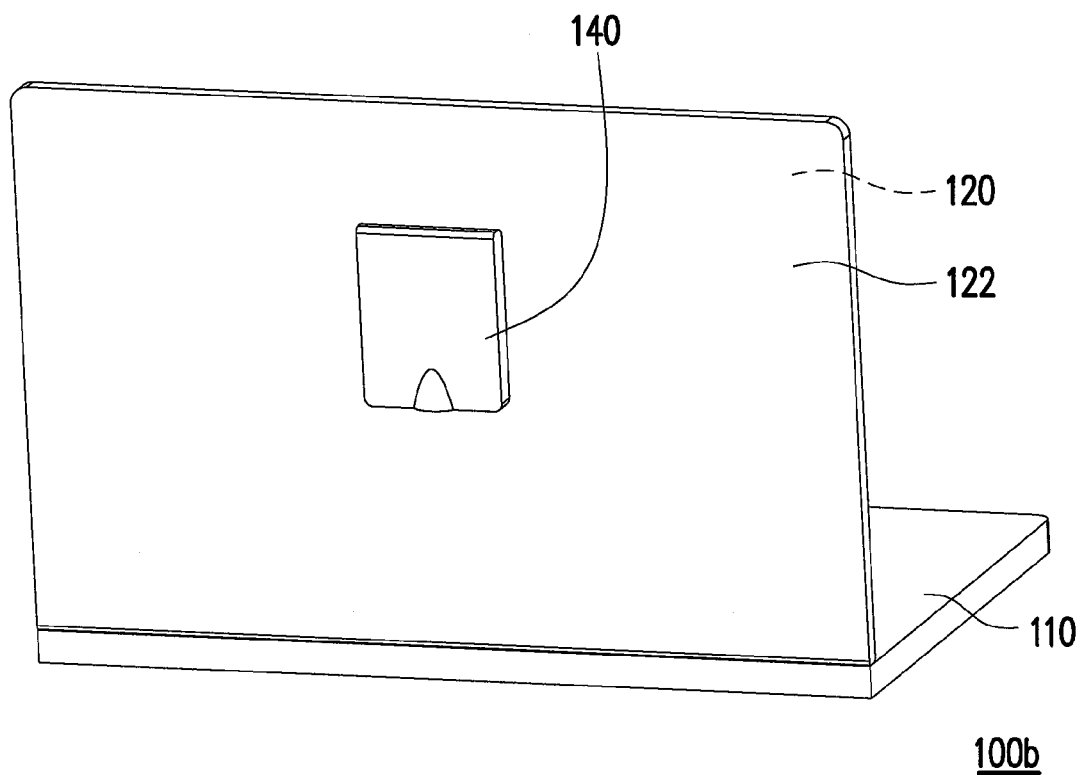
FIG. 4B is a schematic view of a back cover and a projection module depicted in FIG. 4A.

FIG. 4A is a schematic view of a portable electronic device with a projection function according to another embodiment of the present invention. FIG. 4B is a schematic view of a back cover and a projection module depicted in FIG. 4A. Referring to FIGS. 4A and 4B, in the present embodiment, a portable electronic device 100b includes a host 110, a display unit 120, and a projection module 140. Here, the portable electronic device 100b is, for example, a notebook computer.

Particularly, the host 110 has an operation surface 112, a keyboard 114, and a touch panel 116. The keyboard 114 and the touch panel 116 are disposed on the operation surface 112. The display unit 120 is pivoted to the host 110 and has a back cover 122. The projection module 140 is pivoted to the back cover 122 for outputting an image light beam along a projection direction.

Figure 4C:
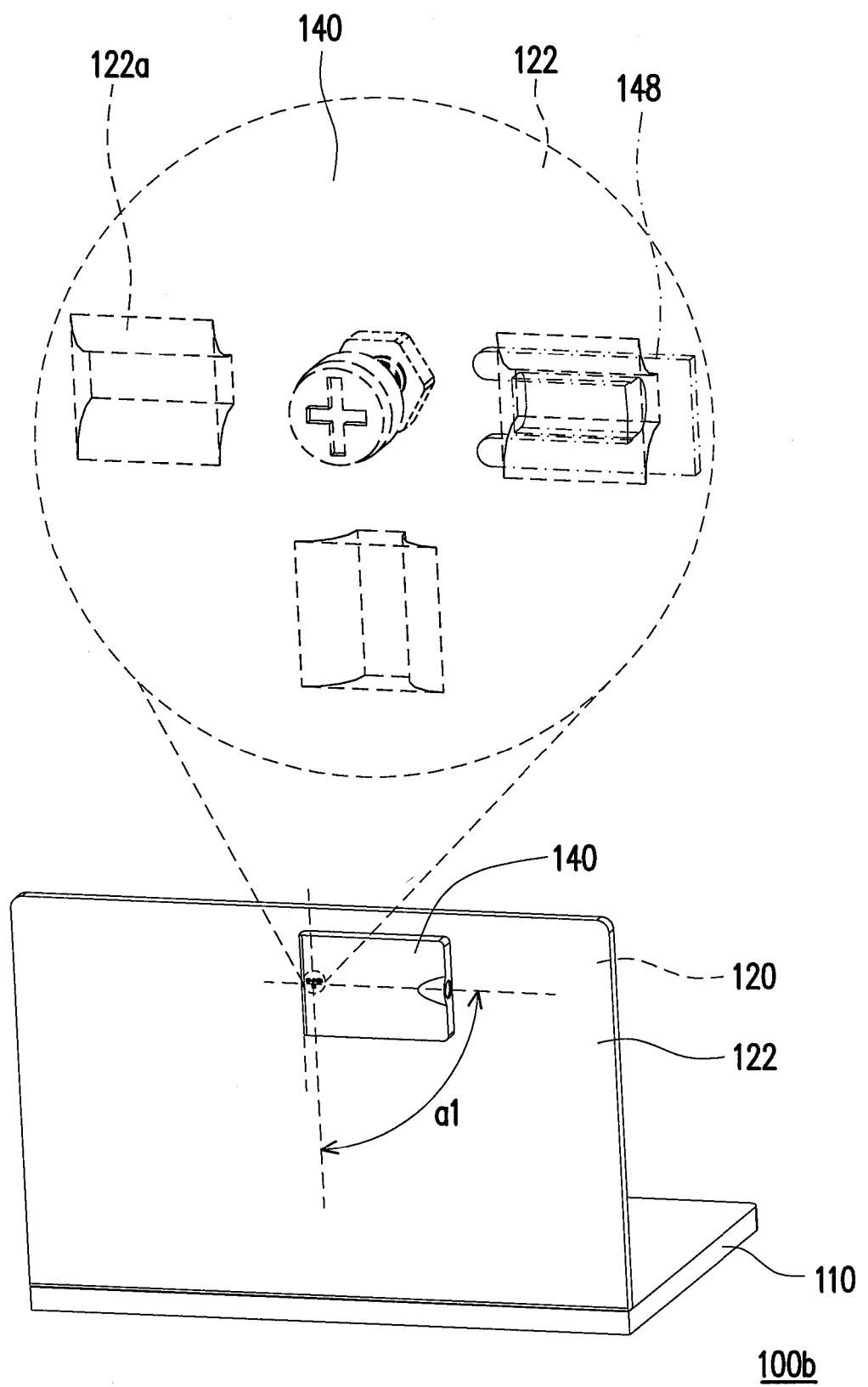
FIG. 4C is a schematic view of a pivot angle formed by the back cover and the projection module depicted in FIG. 4B.

To be more specific, please refer to FIG. 4C which is a schematic view of a pivot angle formed by the back cover and the projection module depicted in FIG. 4B. Referring to FIG. 4C, in the present embodiment, the projection module 140 has an elastic flange 148, the back cover 122 has a plurality of positioning recesses 122a, and the elastic flange 148 can be lodged into one of the positioning recesses 122a for fixing a position of the projection module 140 relative to the back cover 122.

Specifically, according to the present embodiment, a pivot angle a1 formed by the projection direction and the back cover 122 can be adjusted by the pivot of the projection module 140 relative to the back cover 122, and the elastic flange 148 is lodged into one of the positioning recesses 122a for fixing the position of the projection module 140 relative to the back cover 122. Thereby, an image on the display unit 120 can be projected by adjusting the projection direction of the projection module 140 in a relatively simple and easy manner.

Note that in the present invention not only the pivot angle a1 formed by the projection direction and the back cover 122 can be adjusted by the pivot of the projection module 140 relative to the back cover 122, but also an elevation angle a2 (shown in FIG. 3D) formed by the projection direction and the back cover 122 can be adjusted by the pivot of the projection module 140 relative to the back cover 122, which still belongs to a technical means adoptable in the present invention and falls within the protection scope of the present invention.

In light of the foregoing, when a user needs to use the projection module of the present invention, the pivot angle formed by the projection direction and the back cover can be adjusted by the pivot of the bracket relative to the back cover, and the elevation angle formed by the projection direction and the back cover can be adjusted by the pivot of the projection module relative to the bracket. Additionally, a position of a projected image can be adjusted by means of the rotation angle of the projection module relative to the bracket, such that the projection module can be employed in a more convenient manner.

Moreover, the present invention not only expands the application range of the portable electronic device but also provides a more convenient tool for use during conferences or demonstration. It is neither necessary to additionally purchase a conventional projector nor required to install the circuits connecting the conventional projector to an electronic device, thus giving rise to reduced costs and efficient space utilization.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device with a projection function, comprising:
   a host;
   a display unit, pivoted to the host and having a back cover;
   a bracket, pivoted to the back cover; and
   a projection module, pivoted to the bracket for outputting an image light beam along a projection direction,
   wherein a pivot angle formed by the projection direction and the back cover is adjusted by the pivot of the bracket relative to the back cover, and an elevation angle formed by the projection direction and the back cover is adjusted by the pivot of the projection module relative to the bracket.

2. The portable electronic device with the projection function as claimed in claim 1, wherein the bracket has an elastic flange, the back cover has a plurality of positioning recesses, and the elastic flange is lodged into one of the plurality of positioning recesses for fixing a position of the bracket relative to the back cover.

3. The portable electronic device with the projection function as claimed in claim 1, wherein one of the projection module and the bracket has a bearing, and the other one of the projection module and the bracket has an axle fitting the bearing.

4. The portable electronic device with the projection function as claimed in claim 1, wherein the projection module has a first annular wave-shaped surface, and the bracket has a second annular wave-shaped surface corresponding to the first annular wave-shaped surface to pivot stepwise the projection module relative to the bracket.

5. The portable electronic device with the projection function as claimed in claim 4, further comprising:
   a first component, disposed in the projection module; and
   a second component, disposed in the bracket,
   wherein the first component and the second component have a magnetic attraction force therebetween to force the first annular wave-shaped surface to contact the second annular wave-shaped surface.

6. The portable electronic device with the projection function as claimed in claim 5, wherein at least one of the first component and the second component is a permanent magnet.

7. The portable electronic device with the projection function as claimed in claim 6, wherein at least one of the first component and the second component is a magnetically sensitive component.

8. The portable electronic device with the projection function as claimed in claim 1, wherein the host has an operation surface, a keyboard, and a touch panel, and the keyboard and the touch panel are disposed on the operation surface.

9. A portable electronic device with a projection function, comprising:
   a host;
   a display unit, pivoted to the host and having a back cover; and
   a projection module, pivoted to the back cover for outputting an image light beam along a projection direction, wherein a pivot angle or an elevation angle formed by the projection direction and the back cover is adjusted by the pivot of the projection module relative to the back cover.

10. The portable electronic device with the projection function as claimed in claim 9, wherein the projection module has an elastic flange, the back cover has a plurality of positioning recesses, and the elastic flange is lodged into one of the plurality of positioning recesses for fixing a position of the projection module relative to the back cover.

11. The portable electronic device with the projection function as claimed in claim 9, wherein the host has an operation surface, a keyboard, and a touch panel, and the keyboard and the touch panel are disposed on the operation surface.

* * * * *